(12) United States Patent
Sabella et al.

(10) Patent No.: US 8,286,138 B2
(45) Date of Patent: Oct. 9, 2012

(54) MULTI-THREADED DETECTION OF A GAME SOFTWARE DEBUGGER

(75) Inventors: Vito Sabella, Redmond, WA (US); Aaron Khoo, Redmond, WA (US); Johnathon Christopher Henry, Startup, WA (US); Chao Gu, Redmond, WA (US); Ray Thompson, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1654 days.

(21) Appl. No.: 11/669,095

(22) Filed: Jan. 30, 2007

(65) Prior Publication Data

US 2008/0184239 A1 Jul. 31, 2008

(51) Int. Cl.
*G06F 9/44* (2006.01)

(52) U.S. Cl. ........................................ 717/127

(58) Field of Classification Search ............... None
See application file for complete search history.

(56) References Cited

U.S. PATENT DOCUMENTS

| | | | | |
|---|---|---|---|---|
| 5,504,898 A * | 4/1996 | Klein | ............ | 718/101 |
| 5,533,123 A * | 7/1996 | Force et al. | ............ | 713/189 |
| 5,782,477 A | 7/1998 | Covert | ............ | 280/79.7 |
| 5,835,763 A * | 11/1998 | Klein | ............ | 718/101 |
| 6,006,190 A * | 12/1999 | Baena-Arnaiz et al. | ......... | 705/56 |
| 6,009,543 A | 12/1999 | Shavit | ............ | 714/200 |
| 6,192,475 B1 | 2/2001 | Wallace | ............ | 713/190 |
| 6,205,550 B1 | 3/2001 | Nardone et al. | ............ | 713/200 |
| 6,694,435 B2 | 2/2004 | Kiddy | ............ | 713/189 |
| 6,779,114 B1 | 8/2004 | Chow et al. | ............ | 713/189 |
| 6,829,710 B1 | 12/2004 | Venkatesan et al. | ......... | 713/176 |
| 7,149,900 B2 * | 12/2006 | Rothrock | ............ | 713/189 |
| 7,370,319 B2 * | 5/2008 | Pensak et al. | ............ | 717/124 |
| 7,694,341 B2 * | 4/2010 | Mensch et al. | ............ | 726/26 |
| 7,779,394 B2 * | 8/2010 | Homing et al. | ............ | 717/136 |
| 7,818,799 B2 * | 10/2010 | Chen et al. | ............ | 726/22 |
| 2002/0087710 A1 * | 7/2002 | Aiken et al. | ............ | 709/232 |
| 2002/0120854 A1 | 8/2002 | LeVine et al. | ............ | 713/189 |
| 2003/0023873 A1 | 1/2003 | Ben-Itzhak | ............ | 713/201 |
| 2003/0226007 A1 | 12/2003 | Olson et al. | ............ | 713/150 |
| 2006/0005251 A1 | 1/2006 | Wu et al. | ............ | 726/26 |
| 2006/0195906 A1 | 8/2006 | Jin et al. | ............ | 726/26 |
| 2007/0234070 A1 * | 10/2007 | Horning et al. | ............ | 713/190 |

OTHER PUBLICATIONS

EXECryptor, Management & distribution: EXECryptor 2.3.7-Software Executable Code Protection Tool, http://www.dnka.com/software/EXECryptor/3385.html, Version 2.3.7, 3 pages.

(Continued)

*Primary Examiner* — Jason Mitchell
(74) *Attorney, Agent, or Firm* — Woodcock Washburn LLP

(57) ABSTRACT

An anti-debugging mechanism is implemented into a game application, such that the anti-debugging mechanism is difficult to detect, difficult to bypass, and difficult to remove. The anti-debugging mechanism is implemented in a simulated thread pool. The anti-debugging mechanism executes on a different thread than the thread on which the game application executes and is randomly activated. When a debugger is detected, the performance of the debugger is hindered by halting the game application on a different thread than the game thread. Further, a period of time is allowed to elapse before the game application is halted.

18 Claims, 5 Drawing Sheets

OTHER PUBLICATIONS

Starforce, StarForce drivers Pass "Designed for Windows XP" Test, http://www.star-force.com/protection.phtml, 2000-2006, 3 pages.

SWF Debug Remover, Dcomsoft.com-SWF Utilities, http://www.dcomsoft.com/en/product/SWF_DEBUG_Remover/, 2000-2005, 2 pages.

Software Protection and Anti-Tamper Solutions for Hostile Environments, 2006, http://www.cloakware.com/news_events/documents/CW-CSS-DS-USE, 2 pages.

UltraProtect—Embedded Protector, AntiCrack Software Protection—Software Protection and Software License Management Tools for Development—Product, 2004-2005, http://www.ultraprotect.com/embed.htm, 3 pages.

* cited by examiner

MULTI-THREADED DETECTION OF A GAME SOFTWARE DEBUGGER

TECHNICAL FIELD

The technical field relates generally to computer processing and more specifically to online gaming.

BACKGROUND

It is not uncommon for game players to cheat in order to appear to be better players than they truly are. Cheating can be especially exacerbating in the online gaming community in which players compete with each other. Often, cheating is in the form of modifications to a game application such as, for example, changes to game data constants and/or characteristics, including the amount of ammunition, the strength of an item, the health of a player, the position of walls, deleting of walls from a map to enable a player to shoot through walls in the game, or the like.

To make modifications to a game, a user typically hacks into her own version of the game application. In many cases, the first step towards hacking the game application is to determine exactly what the game software is doing. One relatively simple way to determine what the game software is doing is to attach a debugger to the game software while it is executing, and observing the instructions and contents of memory. Through debugging, a hacker can discern appropriate places and means for tampering with the game code. Accordingly, game developers are known to install debugger checkers in game code to prevent users from attaching a debugger to the game application. Typically, however, debugger checkers are simple to detect and to circumvent.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

Debugger detection is incorporated into a game application, such that the placement of the debugger detection mechanism and its manner of activation make the debugger detection mechanism difficult to detect and difficult to bypass or remove. In an example embodiment, the debugger detection mechanism is implemented on a simulated thread pool that differs from the game thread. The debugger detection mechanism can be periodically and/or randomly activated. If the debugger detection mechanism detects a debugger in the game thread, the performance of the debugger is hindered. In an example embodiment, the performance of the debugger is hindered by halting game execution in a random manner, at a random time, and/or on a random thread.

BRIEF DESCRIPTION OF THE DRAWINGS

The foregoing summary, as well as the following detailed description, is better understood when read in conjunction with the appended drawings. For the purpose of illustrating multi-threaded detection of a game software debugger, there is shown in the drawings exemplary constructions thereof; however, multi-threaded detection of a game software debugger is not limited to the specific methods and instrumentalities disclosed.

DETAILED DESCRIPTION OF ILLUSTRATIVE EMBODIMENTS

A debugger detection mechanism detects debuggers attached to game software. The debugger detection mechanism is implemented in a thread pool, or collection of threads. The anti-debugger detection mechanism runs on a thread different than the thread on which the game application is running. The anti-debugger detection mechanism can check for a debugger periodically, at random times, or a combination thereof. Various actions can result in response to detection of a debugger by the debugger detection mechanism. In response to detection of a debugger by the debugger detection mechanism, the game application can be shut down immediately or the game application can be shut down at a time period after detection of the debugger. The time period after detection of the debugger can be a fixed time period, a random time period, a quasi-random time period, or a combination thereof. In response to detection of a debugger by the debugger detection mechanism, the game software is shut down on a randomly or quasi-randomly selected thread. In another embodiment, in response to detection of a debugger by the debugger detection mechanism, the game can be slowed down, modified, or the like, rather than being shut down.

Figure 1:
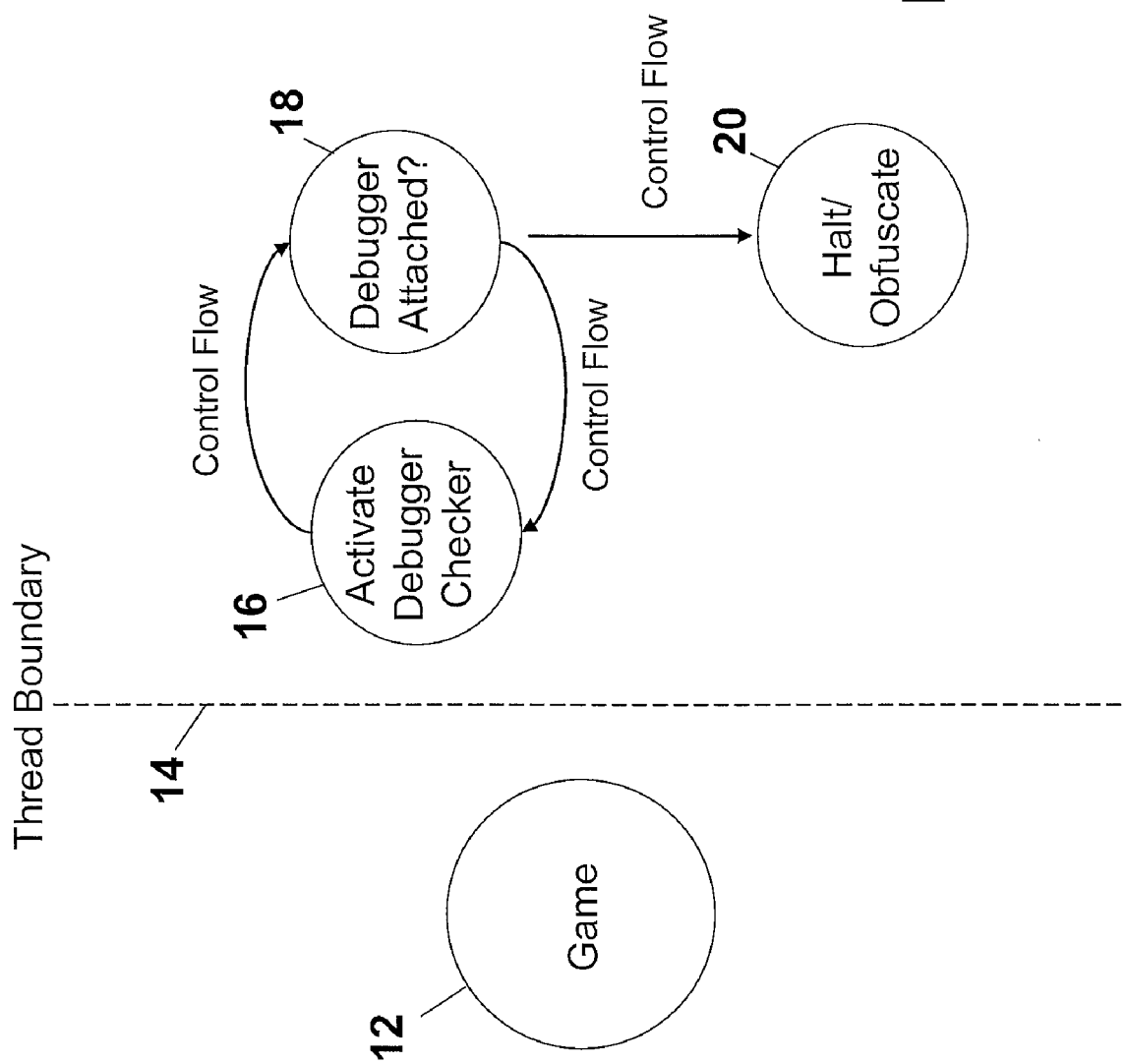
FIG. 1 is an illustration depicting an example control flow for multi-threaded detection of a game software debugger.

FIG. 1 is an illustration depicting an example control flow for multi-threaded detection of a game software debugger. Threads of execution, referred to as threads, are implemented via multitasking or time slicing. In multitasking, multiple tasks (e.g., processes) are scheduled and executed so as to appear to be executing concurrently. Multiple threads execute independently. Multiple threads share resources, such as a CPU and memory, for example. Execution of multiple threads is scheduled such that no one thread monopolizes a system or is starved for resources.

As depicted in FIG. 1, thread boundary 14 indicates that the game component 12 executes on a different thread, or threads, of a system (e.g., XBOX® console) than the thread on which the debugger checker executes. The debugger checker (component 16) is activated on a different thread than the game component 12. From the debugger checker component 16, control passes to component 18, wherein it is determined if a debugger is attached to the game component 12. If no debugger is detected, control flows back to the debugger checker component 16. If a debugger is detected, control flows to component 20 to halt and/or obfuscate operation of the game component 12. The debugger checker and response to detection of a debugger are on the same thread, and that thread is not the same thread on which the game component 12 executes.

Figure 2:
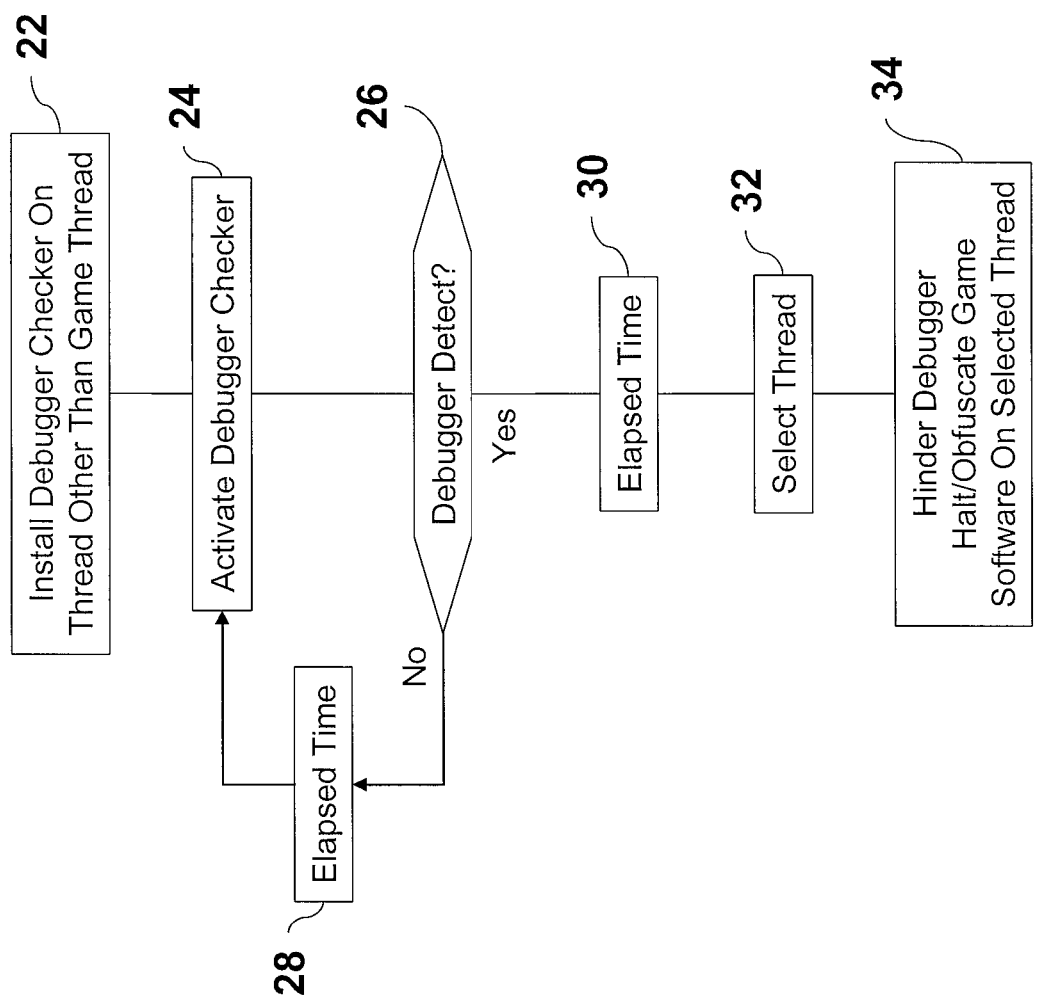
FIG. 2 is a flow diagram of an example process for multi-threaded detection of a game software debugger.

FIG. 2 is a flow diagram of an example process for multi-threaded detection of a game software debugger. In an example embodiment, a game application (e.g., XBOX® game title, XBOX® LIVE game title) is implemented in a multiple thread environment, and a debugger checker is implemented on a thread different than the thread in which the game will execute. The debugger checker is installed at step 22. Debuggers are known in the art. A debugger is a computer program used to test and debug (fix) another program. A debugger checker is a computer program that detects debuggers. An anti-debugger detects a debugger by investigating key operating system specific variables, settings, and state to determine if the system is being debugged. The debugger checker is installed such that execution of the debugger checker is on a thread different than the thread on which the game application executes.

The debugger checker is activated at step 24. The debugger checker is activated to detect debuggers attached to the game application. The debugger checker can be activated at any appropriate time. For example, the debugger checker can be activated when the execution of the game application commences, and/or at boot up. The debugger checker can be activated in any appropriate manner. The debugger checker can be activated periodically, randomly, quasi-randomly, at the occurrence of specific events, when the game system is available, or a combination thereof. The debugger checker can be activated periodically during execution of the game application. The debugger checker could be activated periodically within any appropriate time period. For example, the debugger checker could be activated at least once every 25 seconds, at least once every minute, at least once every 4 minutes, or a combination thereof.

The debugger checker can be activated randomly. For example, the debugger checker can be activated at random times within a time period or time periods. The debugger checker can be event driven. For example, the debugger checker can be activated when events occur in the game, such as when the game is about to perform a sensitive or interesting task, such as granting a new item or object. The debugger checker can be activated whenever resources in the device in which the game and debugger checker are running, are available. For example, the debugger checker could be implemented on a low priority thread of the game device (e.g., game device such as an XBOX® console). Thus, when device resources are available, the thread having the debugger checker will activate the debugger checker.

At step 26, it is determined if a debugger is detected. That is, it is determined if a debugger is attached to the game application. If no debugger is detected (at step 26), the process proceeds to step 24 after an amount of time is elapsed at step 28. The amount of elapsed time can be any appropriate amount of time as described above with respect to activation of the debugger checker. If a debugger is detected (at step 26), an amount of time elapses at step 30, a thread is selected at step 32, and an action is taken, at step 34, on the selected thread to hinder the performance of the debugger. For example, the game application can be halted and/or obfuscated on the selected thread. Thus in response to detection of a debugger, the game software is shut down on a randomly or quasi-randomly selected thread. In another embodiment, in response to detection of a debugger, the game is slowed down, modified, or generally obfuscated, rather than being shut down.

The amount of time that can elapse at step 30 can be any appropriate amount of time. For example the amount of time can be a predetermined fixed amount of time, the amount of time can be in accordance with a predetermined calculation, the amount of time can be random within a fixed period of time, or a combination thereof.

The game application can be halted/obfuscated on any appropriate selected thread. The selected thread can be the same thread on which the debugger checker is executing, or a randomly selected thread. In an example embodiment, the selected thread does not include the thread on which the game application is executing. In an example embodiment, threads are automatically selected by the operating system. And, a different thread can be selected by sending a message to other parts of the program running on different threads.

Figure 3:
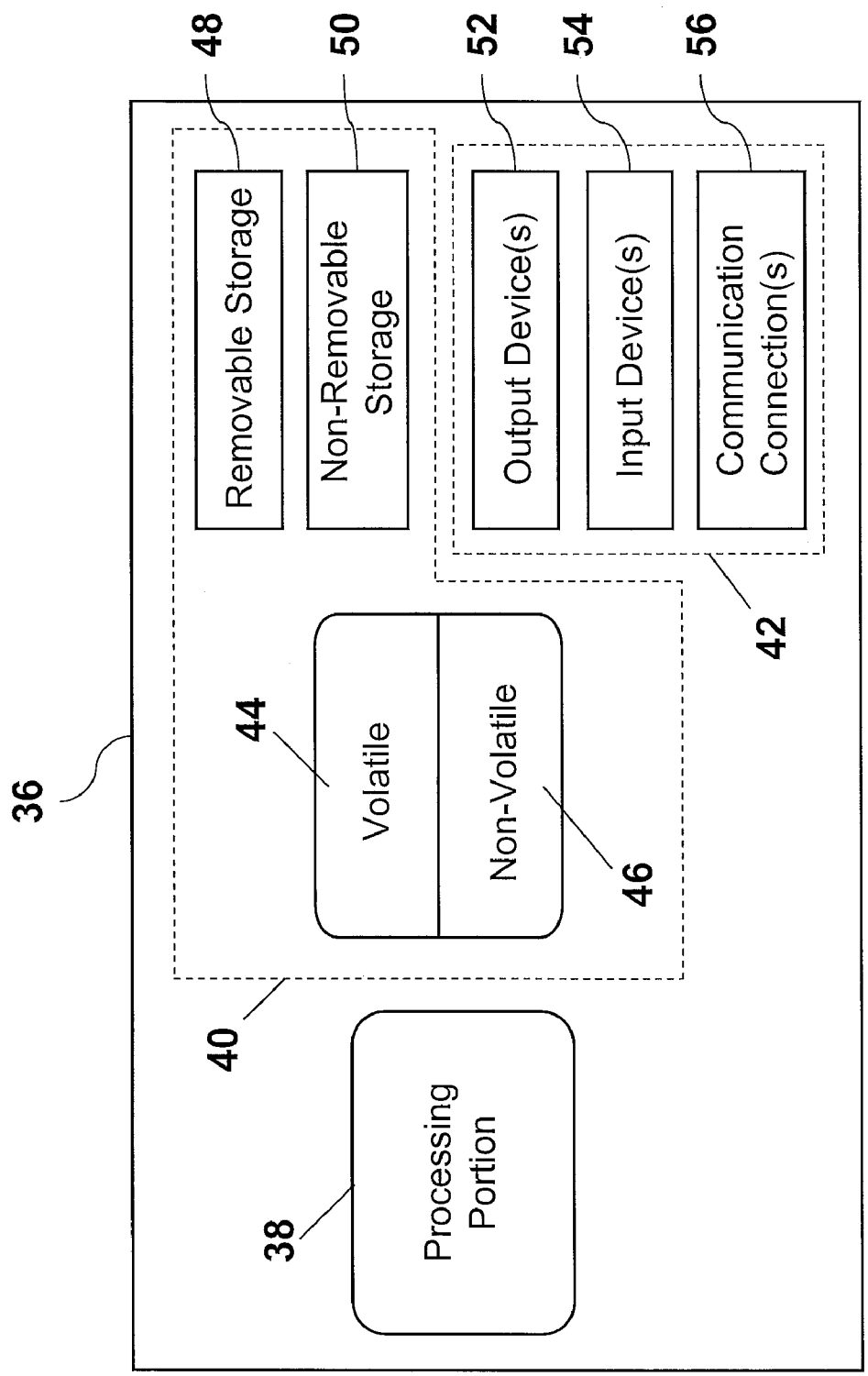
FIG. 3 is a diagram of an exemplary processor for multi-thread debugger detection in game software.

FIG. 3 is a diagram of an exemplary processor 36 for multi-thread debugger detection in game software. In an example embodiment, the processor 36 comprises a game device, such as an XBOX® controller, for example. The processor 36 comprises a processing portion 38, a memory portion 40, and an input/output portion 42. The processing portion 38, memory portion 40, and input/output portion 42 are coupled together (coupling not shown in FIG. 3) to allow communications therebetween. The input/output portion 42 is capable of providing and/or receiving components utilized to implement multi-threaded detection of a game software debugger as described above.

The processing portion 38 is capable of implementing multi-threaded detection of a game software debugger as described above. For example, the processing portion 38 is capable of installing a debugger checker on a thread other than the thread on which the game application is executing, activating a debugger checker, detecting a debugger attached to the game application, determining an amount of elapsed time, selecting threads, halting the game application, obfuscating the game application, or a combination thereof.

The processor 36 can be implemented as a client processor and/or a server processor. In a basic configuration, the processor 36 can include at least one processing portion 38 and memory portion 40. The memory portion 40 can store any information utilized in conjunction with multi-threaded detection of a game software debugger. Depending upon the exact configuration and type of processor, the memory portion 40 can be volatile (such as RAM) 44, non-volatile (such as ROM, flash memory, etc.) 46, or a combination thereof. The processor 36 can have additional features/functionality. For example, the processor 36 can include additional storage (removable storage 48 and/or non-removable storage 50) including, but not limited to, magnetic or optical disks, tape, flash, smart cards or a combination thereof. Computer storage media, such as memory portion 40, 44, 46, 48, and 50, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 36. Any such computer storage media can be part of the processor 36.

The processor 36 can also contain communications connection(s) 56 that allow the processor 36 to communicate with other devices, such as other devices in an online gaming scenario, for example. Communications connection(s) 56 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 36 also can have input device(s) 54 such as keyboard, mouse, pen, voice input device, touch input device, etc. Output device(s) 52 such as a display, speakers, printer, etc. also can be included.

Figure 4:
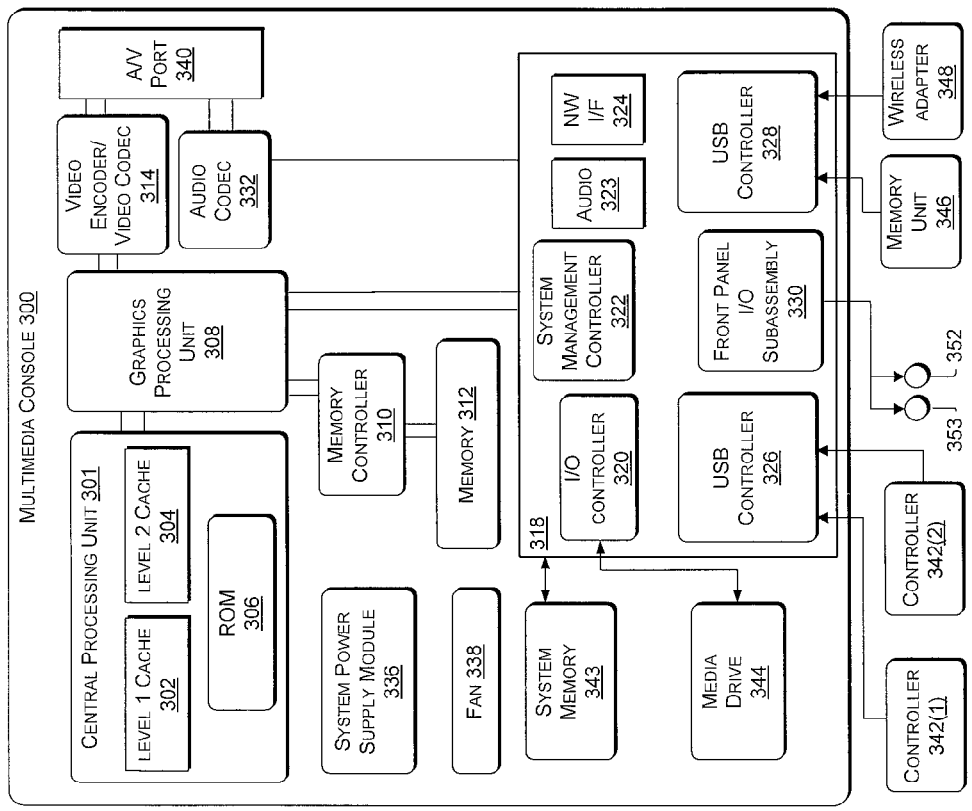
FIG. 4 illustrates functional components of a multimedia/gaming console that can be used to implement multi-threaded detection of a game software debugger.

FIG. 4 illustrates functional components of a multimedia/gaming console 300 that can be used to implement multi-threaded detection of a game software debugger. In an example embodiment, the multimedia console 300 represents a more detailed depiction of a game device, such as the processor 36 implemented as a game device. In this example embodiment, the memory portions, processing portions, and the input/output portions of the multimedia console 300 are capable of performing the functions of the memory portions, processing portions, and the input/output portions of the processor 36, respectively. The multimedia console 300 has a central processing unit (CPU) 301 having a level 3 cache 302, a level 2 cache 304, and a flash ROM (Read Only Memory) 306. The level 3 cache 302 and a level 2 cache 304 temporarily store data and hence reduce the number of memory access cycles, thereby improving processing speed and throughput. The CPU 301 can be provided having more than one core, and thus, additional level 3 and level 2 caches 302 and 304. The flash ROM 306 can store executable code that is loaded during an initial phase of a boot process when the multimedia console 300 is powered ON.

A graphics processing unit (GPU) 308 and a video encoder/video codec (coder/decoder) 314 form a video processing pipeline for high speed and high resolution graphics processing. Data is carried from the graphics processing unit 308 to the video encoder/video codec 314 via a bus. The video processing pipeline outputs data to an A/V (audio/video) port 340 for transmission to a television or other display. A memory controller 310 is connected to the GPU 308 to facilitate processor access to various types of memory 312, such as, but not limited to, a RAM (Random Access Memory).

In an exemplary embodiment, the multimedia console 300 includes an input/output (I/O) controller 320, a system management controller 322, an audio processing unit 323, a network interface controller 324, a first USB host controller 326, a second USB controller 328 and a front panel I/O subassembly 330 that can be implemented on a module 318. The USB controllers 326 and 328 serve as hosts for peripheral controllers 342(1)-142(2), a wireless adapter 348, and an external memory device 346 (e.g., flash memory, external CD/DVD ROM drive, removable media, etc.). The network interface 324 and/or wireless adapter 348 provide access to a network (e.g., the Internet, home network, etc.) and can be any of a wide variety of various wired or wireless adapter components including an Ethernet card, a modem, a Bluetooth module, a cable modem, and the like.

System memory 343 is provided to store application data that is loaded during the boot process. A media drive 344 is provided and can comprise a DVD/CD drive, hard drive, or other removable media drive, etc. The media drive 344 can be internal or external to the multimedia console 300. Application data can be accessed via the media drive 344 for execution, playback, etc. by the multimedia console 300. The media drive 344 is connected to the I/O controller 320 via a bus, such as a Serial ATA bus or other high speed connection (e.g., IEEE 3394).

The system management controller 322 provides a variety of service functions related to assuring availability of the multimedia console 300. The audio processing unit 323 and an audio codec 332 form a corresponding audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button 353 and the eject button 352, as well as any LEDs (light emitting diodes) or other indicators exposed on the outer surface of the multimedia console 300. A system power supply module 336 provides power to the components of the multimedia console 300. A fan 338 cools the circuitry within the multimedia console 300.

The CPU 301, GPU 308, memory controller 310, and various other components within the multimedia console 300 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 300 is powered ON, application data can be loaded from the system memory 343 into memory 312 and/or caches 302, 304 and executed on the CPU 301. The application can present a graphical user interface that provides a consistent user experience when navigating to different media types available on the multimedia console 300. In operation, applications and/or other media contained within the media drive 344 can be launched or played from the media drive 344 to provide additional functionalities to the multimedia console 300.

The multimedia console 300 can be operated as a standalone system by simply connecting the system to a television or other display. In this standalone mode, the multimedia console 300 allows one or more users to interact with the system, watch movies, or listen to music. However, with the integration of broadband connectivity made available through the network interface 324 or the wireless adapter 348, the multimedia console 300 can further be operated as a participant in the larger network community, such as an online gaming community for example.

Figure 5:
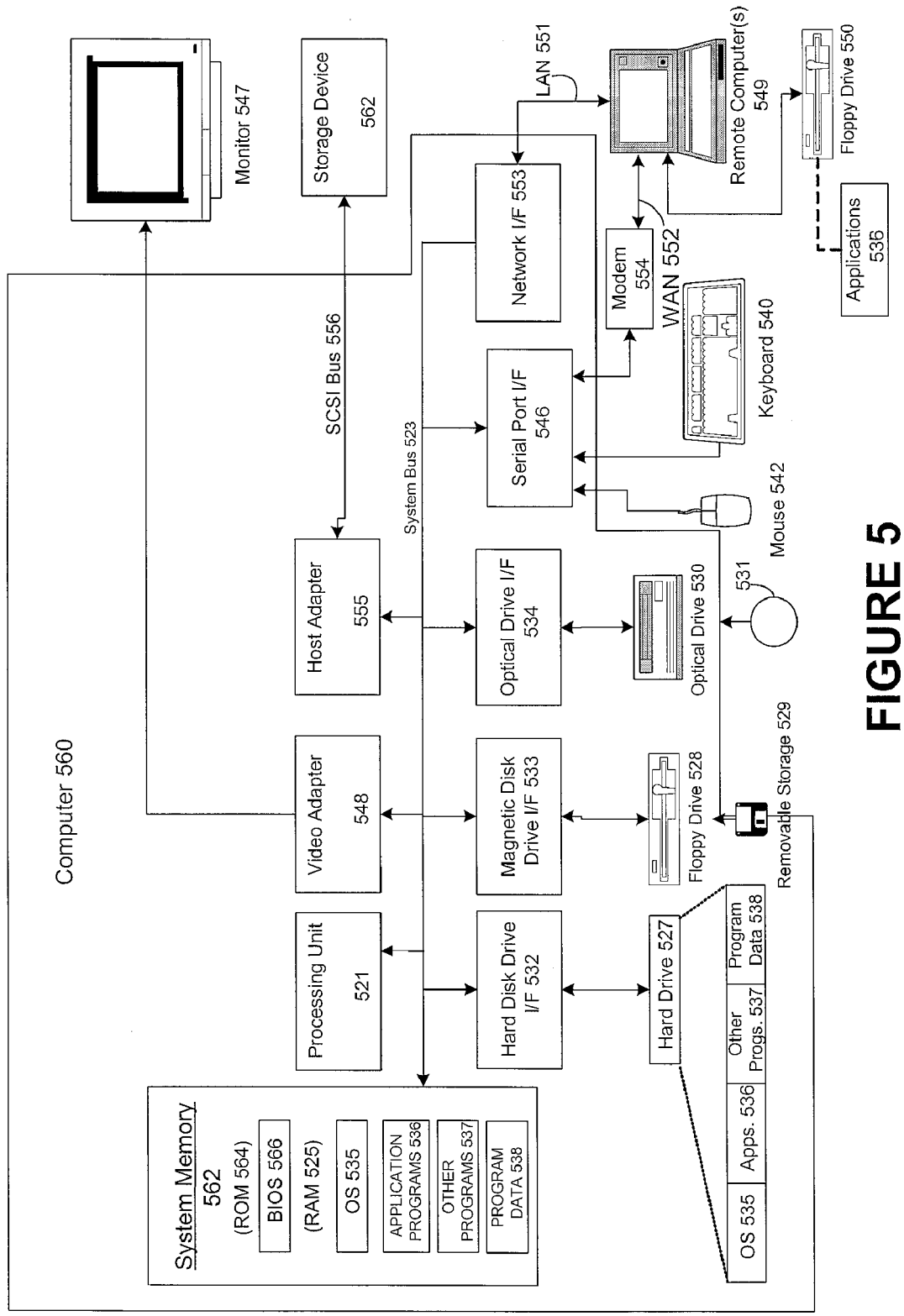
FIG. 5 is a depiction of a suitable computing environment in which multi-threaded detection of a game software debugger can be implemented.

FIG. 5 and the following discussion provide a brief general description of a suitable computing environment in which multi-threaded detection of a game software debugger can be implemented. Although not required, various aspects of multi-threaded detection of a game software debugger can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of multi-threaded detection of a game software debugger can be practiced with other computer system configurations, including hand held devices, multi processor systems, microprocessor based or programmable consumer electronics, network PCs, minicomputers, mainframe computers, and the like. Further, multi-threaded detection of a game software debugger also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 521, the memory (both ROM 564 and RAM 525), the basic input/output system (BIOS) 566, and various input/output (I/O) devices such as a keyboard 540, a mouse 542, a monitor 547, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with multi-threaded detection of a game software debugger as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 5, an exemplary general purpose computing system includes a conventional computing device 560 or the like, including a processing unit 521, a system memory 562, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read only memory (ROM) 564 and random access memory (RAM) 525. A basic input/output system 566 (BIOS), containing basic routines that help to transfer information between elements within the computing device 560, such as during start up, is stored in ROM 564. The computing device 560 may further include a hard disk drive 527 for reading from and writing to a hard disk (hard disk not shown), a magnetic disk drive 528 (e.g., floppy drive) for reading from or writing to a removable magnetic disk 529 (e.g., floppy disk, removal storage), and an optical disk drive 530 for reading from or writing to a removable optical disk 531 such as a CD ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer readable media provide non volatile storage of computer readable instructions, data structures, program modules and other data for the computing device 560. Although the exemplary environment described herein employs a hard disk, a removable magnetic disk 529, and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 529, optical disk 531, ROM 564, or RAM 525, including an operating system 535, one or more application programs 536, other program modules 537, and program data 538. A user may enter commands and information into the computing device 560 through input devices such as a keyboard 540 and pointing device 542 (e.g., mouse). Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, computing devices typically include other peripheral output devices (not shown), such as speakers and printers. The exemplary environment of FIG. 5 also includes a host adapter 555, Small Computer System Interface (SCSI) bus 556, and an external storage device 562 connected to the SCSI bus 556.

The computing device 560 may operate in a networked environment using logical connections to one or more remote computers, such as a remote computer 549. The remote computer 549 may be another computing device (e.g., personal computer), a server, a router, a network PC, a peer device, or other common network node, and typically includes many or all of the elements described above relative to the computing device 560, although only a memory storage device 550 (floppy drive) has been illustrated in FIG. 5. The logical connections depicted in FIG. 5 include a local area network (LAN) 551 and a wide area network (WAN) 552. Such networking environments are commonplace in offices, enterprise wide computer networks, intranets and the Internet.

When used in a LAN networking environment, the computing device 560 is connected to the LAN 551 through a network interface or adapter 553. When used in a WAN networking environment, the computing device 560 can include a modem 554 or other means for establishing communications over the wide area network 552, such as the Internet. The modem 554, which may be internal or external, is connected to the system bus 523 via the serial port interface 546. In a networked environment, program modules depicted relative to the computing device 560, or portions thereof, may be stored in the remote memory storage device. It will be appreciated that the network connections shown are exemplary and other means of establishing a communications link between the computers may be used.

While it is envisioned that numerous embodiments of multi-threaded detection of a game software debugger are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing multi-threaded detection of a game software debugger, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing multi-threaded detection of a game software debugger.

The program(s) can be implemented in assembly or machine language, if desired. In any case, the language can be a compiled or interpreted language, and combined with hardware implementations. The methods and apparatuses for implementing multi-threaded detection of a game software debugger also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of multi-threaded detection of a game software debugger. Additionally, any storage techniques used in connection with multi-threaded detection of a game software debugger can invariably be a combination of hardware and software.

While multi-threaded detection of a game software debugger has been described in connection with the example embodiments of the various figures, it is to be understood that other similar embodiments can be used or modifications and additions can be made to the described embodiments for performing the same functions of multi-threaded detection of a game software debugger without deviating therefrom. Therefore, multi-threaded detection of a game software debugger as described herein should not be limited to any single embodiment, but rather should be construed in breadth and scope in accordance with the appended claims.

What is claimed:

1. A method comprising:
   executing a game application on a first game thread of a system;
   implementing a debugger detector on a second thread of the system, wherein the second thread differs from the first game thread and is separated from the first game thread by a thread boundary;
   determining if a debugger is attached to the game application;
   if it is determined that a debugger is attached to the game application; hindering performance of the detected debugger, the hindering comprising halting a third thread that is randomly selected from a simulated thread pool of the system.

2. A method in accordance with claim 1, further comprising allowing an amount of time to elapse between determining a debugger is attached to the game application and hindering performance of the debugger.

3. A method in accordance with claim 2, wherein the amount of time is randomly determined.

4. A method in accordance with claim 2, wherein the amount of time comprises a predetermined amount of time.

5. A method in accordance with claim 2, wherein the amount of time is determined in accordance with an event occurring in the system.

6. A method in accordance with claim 1, wherein the second thread is selected from a simulated thread pool.

7. A method in accordance with claim 1, wherein the step of determining if a debugger is attached to the game application is performed at random times.

8. A method in accordance with claim 1, wherein the step of determining if a debugger is attached to the game application is performed in accordance with resource availability of the system.

9. A device comprising:
   memory comprising executable instructions;
   a game application implemented on a first thread of the device,
   a debugger detector implemented on a second thread of the device, the second thread separated from the first thread by a thread boundary; and
   a processor coupled to the memory, the processor configured to execute the executable instructions to:
      determine if a debugger is attached to the game application; and
      if it is determined that a debugger is attached to the game application, obfuscate execution of the game application by shutting down a third thread that is randomly selected from a simulated thread pool of the system.

10. A device in accordance with claim 9, the device further configured to allow an amount of time to elapse between determining a debugger is attached to the game application and performing one of halting the game application or obfuscating the execution of the game application.

11. A device in accordance with claim 10, wherein the amount of time is randomly determined.

12. A device in accordance with claim 10, wherein the amount of time comprises a predetermined amount of time.

13. A device in accordance with claim 10, wherein the amount of time is determined in accordance with an event occurring in the device.

14. A device in accordance with claim 9, wherein the device is configured to determine, at random times, if a debugger is attached to the game application.

15. A device in accordance with claim 9, wherein the device is configured to periodically determine if a debugger is attached to the game application.

16. A device in accordance with claim 9, wherein the device is configured to determine if a debugger is attached to the game application in accordance with resource availability of the device.

17. A computer-readable storage medium that is not a signal, the computer-readable storage medium having stored thereon computer-executable instructions for performing the steps of:
    utilizing a debugger detector to determine if a debugger is attached to a game application executed on a first thread of a system, the debugger detector implemented on a simulated thread that differs from the first thread; and
    if it is determined that a debugger is attached to the game application; hindering performance of the detected debugger, the hindering comprising halting a third thread that is randomly selected from a simulated thread pool of the system.

18. A computer-readable storage medium in accordance with claim 17, the computer-executable instructions further for allowing an amount of time to elapse between determining a debugger is attached to the game application and hindering performance of the detected debugger.

\* \* \* \* \*